US006469464B1

(12) United States Patent
McCall

(10) Patent No.: US 6,469,464 B1
(45) Date of Patent: Oct. 22, 2002

(54) AUTOMATIC SAFETY GARAGE DOOR CLOSER

(76) Inventor: Steve McCall, 1308 W. Wellington, Chicago, IL (US) 60657

( * ) Notice: Subject to any disclaimer, the term of this patent is extended or adjusted under 35 U.S.C. 154(b) by 0 days.

(21) Appl. No.: 09/652,558

(22) Filed: Aug. 31, 2000

(51) Int. Cl.[7] ................................................ H02P 7/00

(52) U.S. Cl. ....................... 318/445; 318/266; 318/282; 318/245; 318/254; 318/434; 318/468; 318/469

(58) Field of Search ................................ 318/266, 282, 318/468, 469, 434, 443, 245, 254

(56) References Cited

U.S. PATENT DOCUMENTS

| | | | | | |
|---|---|---|---|---|---|
| 3,575,586 | A | * | 4/1971 | Kroll | 235/61.9 |
| 4,433,274 | A | * | 2/1984 | Duhame | 318/283 |
| 4,463,292 | A | | 7/1984 | Engelmann | 318/283 |
| 4,922,168 | A | | 5/1990 | Waggamon et al. | 318/286 |
| 5,191,268 | A | | 3/1993 | Duhame | 318/266 |
| 5,285,136 | A | | 2/1994 | Duhame | 318/266 |
| 5,428,923 | A | | 7/1995 | Waggamon | 49/28 |
| 5,493,812 | A | | 2/1996 | Teich | 49/26 |
| 5,508,511 | A | | 4/1996 | Zur | 250/222.1 |
| 5,589,747 | A | | 12/1996 | Utke | 318/468 |
| 5,596,840 | A | | 1/1997 | Teich | 49/26 |
| 5,625,980 | A | | 5/1997 | Teich et al. | 49/26 |
| 5,656,900 | A | | 8/1997 | Michel | 318/286 |
| 5,780,987 | A | * | 7/1998 | Fitzgibbon et al. | 318/466 |
| 5,998,950 | A | * | 12/1999 | Fitzgibbon et al. | 318/280 |
| 6,075,333 | A | * | 6/2000 | Huddle | 318/468 |
| 6,107,765 | A | * | 8/2000 | Fitzgibbon et al. | 318/266 |
| 6,111,374 | A | * | 8/2000 | Fitzibbon et al. | 318/282 |

* cited by examiner

*Primary Examiner*—Robert Nappi
*Assistant Examiner*—Tyrone Smith
(74) *Attorney, Agent, or Firm*—Cook, Alex, McFarron, Manzo, Cummings & Mehler

(57) ABSTRACT

An automatic door operating safety system particularly used with garage doors is provided. A security timer for a powered overhead garage door causes the door to close after it has been opened for a predetermined time interval. Before timeout, the system will determine by its various sensors whether there is any activity within the area. Upon the absence of such activity the system signals the command for door closure.

12 Claims, 3 Drawing Sheets

AUTOMATIC SAFETY GARAGE DOOR CLOSER

BACKGROUND OF THE INVENTION

The present invention relates generally to a garage door operator and, in particular, to an automatic garage door closer having a safety sensor for determining whether there is any activity within the garage, particularly a running vehicle, and further having, upon the absence of such activity, a programmable and pre-determined timer and command for the closing of the door.

Remote controlled door operators have become the staple use in residences, parking areas and other locations to which controlled access is deemed essential or desirable. Typically, the remote door operator includes, in addition to the mechanical components of the door and the door mounting system, a motor which is capable of driving the door between an open and a closed position, and a motor controller adapted to be connected to a power supply and which is operatively associated with the motor for controlling the movements of the door in response to various signals. In addition, the typical door operator system comprises a low power, limited range radio transmitter having a pushbutton which is actuable to produce a coded signal, and a radio receiver/decoder for triggering operation of the controller when the coded signal is received in the proper format. This "remote" avoids the need for the driver to get out of the car to open and close the door in the case of a garage and the like. In addition to the transmitter, such a system also includes a manual wall switch to control the movement of the door.

Although the majority of the problems associated with such a door operating system occur with the remote operator, any damage done, or other essential safety issues, are typically associated with the movement of the door. For example, when a door operator is commanded to close, the door operator may close onto an obstacle in the way of the door which causes damage to the operator. More importantly, the door operator also may close on an object which may be damaged such as an automobile, child's bicycle or even (most particularly), upon a person or child.

With more instances of injury, more laws with regard thereto have been proliferated by the local, state and federal legislate. For example, effective as of Jan. 1, 1993, a law was placed into effect that all electronic garage doors installed must be equipped with a safety device that will reverse a closing door if an obstruction is present in the last six inches of the door's travel, or six inches above ground level. In order to comply with this law, among others, automatic garage door operator manufacturers have incorporated many different safety features. The two such features most incorporated include edge sensors and light beam sensors.

Edge type sensors usually comprise a flexible strip attached to the bottom edge of the garage door, which flexible strip deforms when it comes in contact with an obstacle. Deformation of the flexible strip may increase pressure of a trapped fluid within the strip or close switches signaling the garage door operator that an obstacle has been encountered. The garage door operator then switches into its up mode and immediately raises the garage door. Edge sensors thus provide an open-circuit when no obstruction is sensed and provide an closed-circuit when an obstruction contacts the sensor. This type of sensor is not entirely adequate not only because of its relatively high cost, but more importantly, because once a force was exerted in the opposite direction, a sufficient pressure may have already been exerted against the object to cause damage. For example, if a small child were in the path of the garage door, the child could be knocked down and injured prior to the garage door reversing direction.

On the other hand, light sensors typically include infrared transmitters and receivers hard wired to the motor so that if an obstacle is located between the transmitter and receiver, which necessarily means in the path of the garage door, the receiver would send a signal to a motor controller to reverse direction of the garage door. In other words, the transmitter produces a light beam that is aligned so that it extends across the doorway and strikes the receiver on the other side. As long as the receiver detects the light beam, the receiver outputs a low level signal. When the light beam is broken and the receiver does not detect the presence of the light beam, the sensor outputs a high-level signal indicating the presence of an obstruction in the doorway.

Although these two features may provide for the safety of objects in the path of the garage door, they cannot determine whether there is any activity within the garage, particularly a running vehicle, at the time of door closing. Such a feature is needed when the garage door operating system includes an automatic closer such as that disclosed within U.S. Pat. No. 4,463,292, incorporated herein by reference. Such a system typically includes a security timer for door closure after a predetermined period of time. This automatic closing feature solves the problem of the occasional left open door, or a door that has been opened by stray radio frequency signals. Without the automatic closure, an open door will provide access for intruders to the garage and make it easier for a burglar to break into a door leading from the garage to the house.

However, with this automatic closure comes additional safety problems. Animals, including family pets, people and even small children may get trapped in the garage after the automatic closure. If trapped therein, they may be subjected to extreme heat or extreme cold, trapped gases or even exhaust fumes from a running automobile. The present invention provides for safety features that will determine whether there is any activity in the garage, particularly a running vehicle, before the automatic closure of the door. If desired, the present invention may be combined with the previously discussed edge and/or light sensors to provide for the safest garage door operating system as possible.

Accordingly, it is a general object of the present invention to provide for an improved garage door operator.

It is another general object of the present invention to provide for an automatic garage door closer system.

It is a more specific object of the present invention to provide for a garage door operator having an automatic garage door closer including a safety sensor for determining whether any activity is present within the garage.

Still another more specific object of the present invention is to provide for a garage door operator having an automatic garage door closer including a safety sensor for determining whether an automobile is running within the garage.

SUMMARY OF THE INVENTION

According to the present invention, there is provided a garage door operator having a control unit connected to command the motor to open and close the door. An auto closure module including a timing unit counts down a predetermined period of time for which the door will remain in an opened position before the automatic closure thereof. An activity detector is included for determining whether any activity is present within the garage during the countdown period, and upon activity detection, the auto closure module is disabled.

BRIEF DESCRIPTION OF THE DRAWINGS

The features of the present invention which are believed to be novel are set forth with particularity in the appended claims. The invention, together with the further objects and advantages therefore, may best be understood by reference to the following description taken in conjunction with the accompanying drawings, in the several figures of which like reference numerals identify like elements, and in which:

DESCRIPTION OF THE PREFERRED EMBODIMENTS

The present invention describes the operation and design of an automatic safety door closer. This design may be that of a completely new system, or one which can retrofit an existing system. In operation, the unit will: 1) detect that the door is open 2) allow the door to remain open for a pre-determined period of time, 3) determine by its various sensors that there is no vehicle activity in the area, 4) warn of imminent door closure, and 5) close the door by command to the associated door opener.

Figure 1:
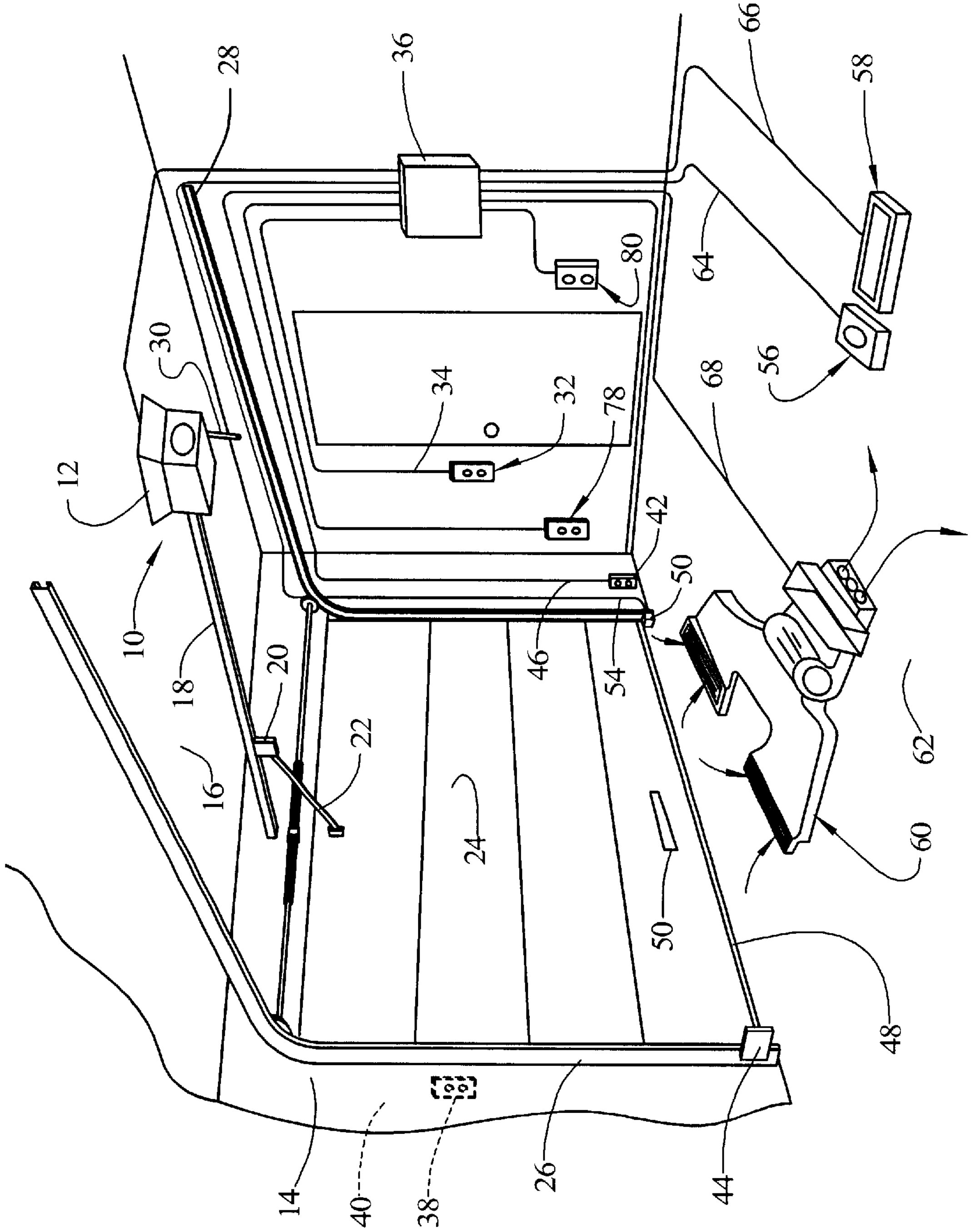
FIG. 1 is a perspective view of a garage door operator designed in accordance with the principles of the present invention mounted within a garage and coupled to a garage door to open and close it.

Referring now to the drawings and in particular to FIG. 1, a garage door operator embodying the present invention is generally shown therein and identified by numeral 10. The garage door operator includes a control or head unit 12 mounted within a garage 14 on a ceiling 16. A transmission including a T-rail or screw drive 18 extends from the control head 12 and has a disconnectable trolley 20 connected thereto. An arm 22 is connected to the trolley and is connected to a multi-panel garage door 24 for opening and closing thereof. The garage door is carried on a pair of L-shaped channels 26 and 28 as is conventional for multi-panel garage doors. A radio transmitter or "remote" (not shown) may communicate by radio frequency energy with an antenna 30 extending from the head unit 12 to cause the head unit to open and close the garage door. Likewise, an inside control panel 32 may communicate over a wire 34 to the head unit 12 through the auto closure circuit module 36. A permanently mounted keypad radio transmitter 38 may also be mounted on the outside wall 40 of the garage and communicate with antenna 30 of the head unit to command the head unit to open and close the door. Light sensors, in the form of a combination photo-emitter and detector 42 and cooperating infrared reflector 44, may be utilized to detect obstacles in the path of the doors travel. The detector 42 is connected by leads 46 to the head unit (through module 36) to receive electrical energy therefrom, while the reflector 44 is positioned at the opposite door edge to receive and reflect back infrared energy to the detector 42.

The above description is of a typical garage door operating system. The present invention, however, has been designed for a garage door system having an automatic door closer. Such a system may generally include a limit switch for either indicating that the door is opening or is already fully opened. A separate unit containing a limit switch with suitable brackets for mounting may be provided to detect that the door is open. For example, such a switch may be door mounted 48 or floor mounted 50. If door mounted, when the door opens, the limit switch 48 contacts close to power a timing/transmitter unit 52 located on the inside of the door 24. Alternatively, if the limit switch is floor mounted 50, upon the opening of the door, contacts close to complete a circuit 54 through the auto close circuit module 36 to a timing unit. Although not shown, a limit switch may alternatively be positioned to extend downwardly from the garage ceiling so as to be contacted (thus contact closure) by the door when the door is near its fully opened position. In any event, upon contact closure, the timing unit will begin its time out feature.

Upon timeout, and assuming the door remains open without any activity detection, a contact closure within unit 52 or perhaps panel 32 signals the door operator to close. The activity detection enables the door to remain open in the event that a person, perhaps asleep at the wheel of a running vehicle, or a small child, is inside the garage. Such an activity detector may include an audio detector 56, a thermal sensor 58, an exhaust sensor 60, or any other detectors capable of determining whether any activity is present within the garage. These detectors are preferably contained within the floor 62 of the garage and may be connected to the module 36 by lead lines (i.e. 64, 66, and 68) in order to inhibit door closure.

Figure 2:
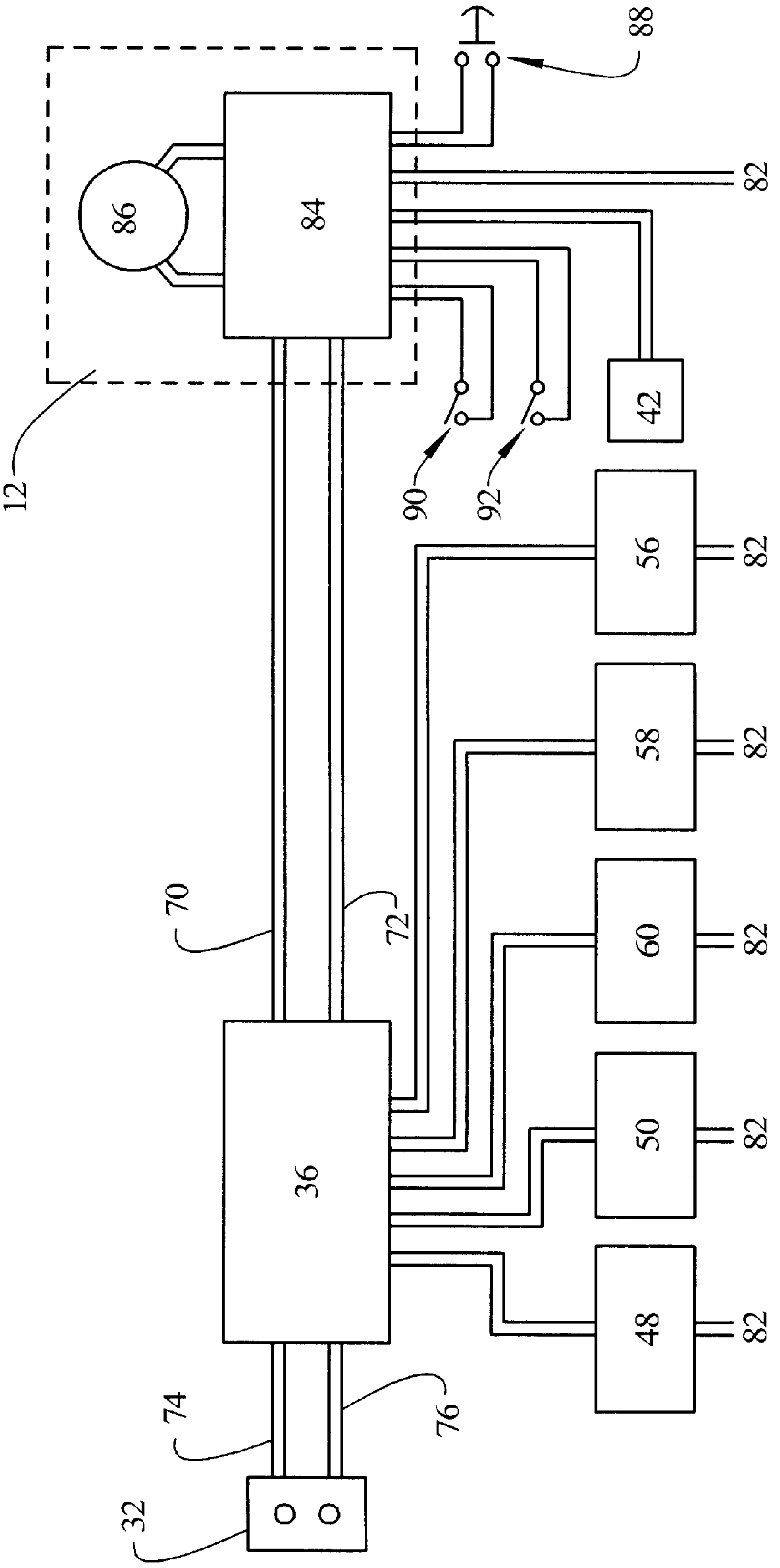
FIG. 2 is a general block diagram of the electronics of the present invention.

With the above general description of the principle parts of the garage door operator designed in accordance with the principles of the present invention, one can now turn to a general block diagram of the electronics thereof as illustrated in FIG. 2. More particularly, FIG. 2 illustrates the principle communication links between the sensors, the auto closure circuit module 36 and the head unit 12. The module 36 tells the head unit 12 whether or not to open 70 and/or close 72 the garage door in response to an analysis (more fully discussed below) of its various inputs. These inputs include the control panel 32 with its open 74 and close 76 switches, and the various sensor inputs. In the preferred embodiment, these sensor inputs include a door mounted 48 and/or floor mounted 50 limit switch, an audio detector 56, a thermal sensor 58 and an exhaust detector 60. Optional inputs may include multiple photocells, such as shown by the front photocell 78 and rear photocell 80 of FIG. 1. These sensors, as well as the head unit 12 are all powered via the typical 120 VAC power outlet (82).

The head unit 12 mainly consists of an operator control circuit 84 and a motor 86. The control circuit 84 analysis signals from the module 36 (70 and 72), as well as its various inputs to determine whether to direct the motor 86 to open and/or close the garage door. The inputs to the control circuit 84 in the preferred embodiment include an on/off control 88, the light sensor 42, as well as the up limit switch 90 and down limit switch 92. The head unit 12 controls the manual door operation via remote control, keypad transmitter 38 or control panel 32.

On the other hand, the automatic door operation is controlled through an analysis within the auto closure circuit module 36. This analysis consists of determining whether the door is open, if it is open then it counts down a predetermined time period, determines whether there is any activity within the garage (particularly a running vehicle) and in the absence thereof, automatically closes the door. It will be understood that the design of this module may take many forms and thus need not resemble FIG. 3 in its entirety. For example, the module need not include all three sensors (56, 58 and 60), or alternatively, may include other sensors capable of detecting activity. In any event, so long as the module can count down a predetermined time period, and automatically close the door if no activity is present, the general principles of the present invention will be achieved.

Figure 3:
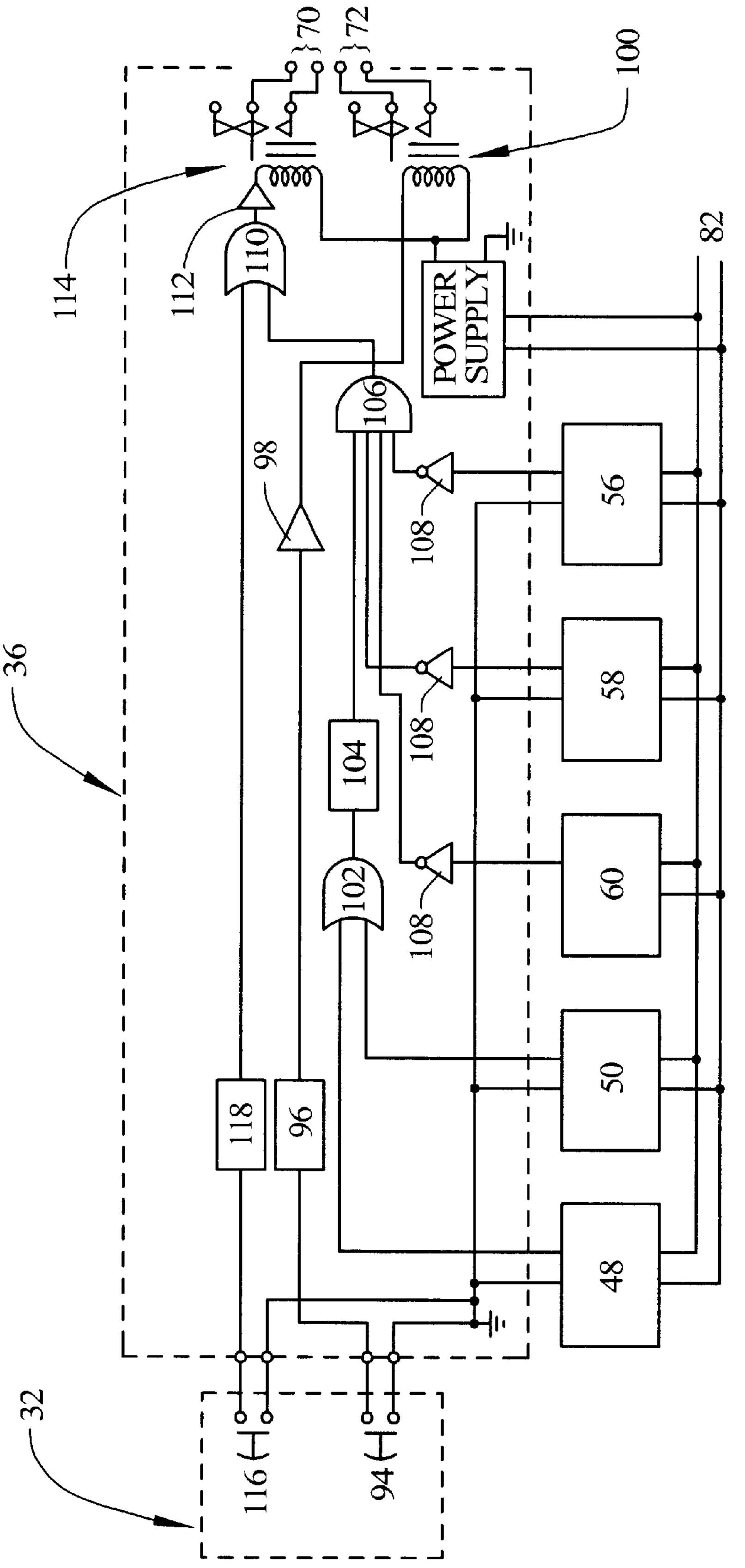
FIG. 3 is a general circuit diagram of the preferred embodiment of the auto closure module of FIG. 2.

More particularly, and referring to FIG. 3, the auto closure circuit module 36 determines if and when to direct the head unit 12 to open/close the door through an internal analysis of its external inputs. These inputs include the manual door control 32 and the sensor inputs (48, 50, 56, 58 and 60). Operation of this module 36 will now be discussed through a typical example of its use.

During operation, the garage door is opened via the manual open button 94 on the door control 32, for example. This generates a signal pulse from the monostable multivibrator 96 through an amplifier 98 to the open transformer 100. The open transformer 100 in turn signals 72 the head unit 12 to open the door. When opened, the door mounted 48 or alternatively the floor mounted 50 limit switch detects same and produces a high signal into OR gate 102. Thus, if a limit switch is activated (door is opened), the timing unit or timer 104 begins its countdown. This countdown being a previously set and predetermined period of time by which the garage owner desires the door to remain open before initiating the automatic closure feature. This countdown period is initially set during the installation of the present invention, but may be adjusted at any time thereafter and/or manually shut off.

AND gate 106 continuously monitors the output of the timer 104 and the output of the inverted and amplified, by virtue of inverting amplifiers 108, signals from the audio 56, thermal 58 and/or exhaust sensors 60. Because the signals from these sensors are inverted, if the sensors DO NOT activate, their output signal will be inverted to high. When the output from the timer 104 is high and all of the outputs from the sensors (56, 58, 60) are inverted to high (not detecting any activity) the output signal of AND gate 106 is therefore high. In other words, when there is no vehicle activity detected in the garage and the timer 104 has timed out, AND gate 106 signals through OR gate 110 and amplifier 112 to the close transformer 114. The close transformer 114 in turn signals to the head unit 12 to close the door.

Alternatively, the automatic door closure operation may be manually bypassed by pressing the door close button 116 on the control panel 32. This generates a signal pulse from the monostable multivibrator 118 to OR gate 110. The output signal from gate 110 is then passed through amplifier 112 to the close transformer 114. The close transformer 114 in turn signals 70 the head unit 12 to close the door.

Additionally, this automatic closure and time-out feature may be manually shut off at any time. The shut-off button may be located, for example, on the control panel 32 next to the door open/close button 94, 116. This is useful if it is desired to keep the door open or to disable the unit. This button may be provided in conjunction with a key-lock switch in order to child-proof the unit. If the button is activated, then the door will remain open until the open/close buttons are depressed either on the control panel 32, keypad 38 or the remote. If the open/close buttons are activated, then the door is closed and the process will continuously check (loop through) to see if the shut-off button has been deactivated or the open/close buttons have been activated.

Although not shown in FIG. 3, when the timer 104 reaches "0", i.e. its predetermined "remain open period", both a visual alarm and an audio alarm are activated for a predetermined period of time to warn of the impending door closure. During this time of impending closure, the activity sensors (56, 58 and 60) continue to check for activity within the garage. If no activity is detected, the door is closed. However, upon the detection of activity during the impending door closure phase, the process reverts back to reset the timer 104.

Although it will be understood that the activity detectors of the present invention shall not be limited hereto, the preferred embodiment consists of an active vehicle detector. Such car detector methods may include audio detection, thermal sensing, inductive pickup and a carbon monoxide detector perhaps in the general form of a typical electrochemical carbon monoxide detector.

The audio detection circuit 56, for example, of the preferred embodiment is primarily designed to detect the sound of the running motor of an automobile. It consists of a microphone, a low and a high frequency cut-off filter, an attenuation block, along with an amplifier and level detector. The filter is tuned to pass the low frequencies typical of an automotive engine. The gain is factory set, but user adjustable to limit false tripping by extraneous noise. More particularly, the preferred embodiment includes a 3 pole low pass and a 4 pole high pass filter to provide a voltage gain roll off of 80 dB per decade below the 3 dB cut off frequency and 60 dB per decade above the 6 dB high cut off frequency. The cut off frequencies are selected to limit false sensing of sounds from heaters, ventilating fans, or other sources from blocking the desired door closing cycle.

With the preceding description of the structure and electronics of a preferred embodiment of the present invention, the following description of the operation thereof is facilitated. Initially, with the garage door 24 closed, the mounted limit switch prevents the timer from activating. When the door 24 is opened, the limit switch contacts close to activate the timer. The unit is thus activated by contact closure which starts an adjustable time delay typically between one to five minutes. If the door remains open after timeout, both audible and visual alarms are activated. The audible alarm producing a loud beeping sound while the alarm light flashes. Both cycle at a one-second ON and one-second OFF rate to warn of the impending door closure. This continues for a predetermined time of typically between five to sixty second intervals.

Once the time interval is completed and assuming the door remains open without any activity detected, a contact closure signals the garage door operator to close. While the door is closing, a continuous tone and steady light is used as a warning to stay clear of the door. This is maintained for a period of time unto which the door is closed. If the door fails to close, the cycle repeats for a predetermined maximum number of attempts or until the door closes.

During the closing cycle, the audible and visual alarms are disabled to prevent false tripping by their activity. Once the door is closed, the door limit switch disables the circuit. No further action takes place until the door is opened again.

While particular embodiments of the invention has been shown and described, it will be obvious to those skilled in the art that changes and modifications may be made therein without departing from the invention in its broader aspects and, therefore, the aim in the appended claims is to cover all such changes and modifications as fall within the true spirit and scope of the invention.

What is claimed is:

1. A garage door operator for use with a garage having a path of door travel area and a general garage area, the operator comprising:

an electric motor;

a transmission connectable to said motor for connection to a garage door to open and close said door through the travel area;

a control unit connected to said motor to command said motor to open and close said door;

an auto closure module including a timing unit for timing a period in which said door is in an opened position, said module capable of actuating said control unit to close said door after said period has timed out; and a vehicle detector for determining whether activity is present within the general garage area, said detector being an audio detector, upon activity detection said detector being further capable of disabling said module from automatically closing the door upon timing out.

2. A garage door operator as defined in claim 1 wherein said timing unit is variable.

3. A garage door operator as defined in claim 1 wherein said timing unit is initiated upon the closing of a limit switch upon an opened door.

4. A garage door operator as defined in claim 1 further including a manual shut-off for deactivating said module.

5. A garage door operator as defined in claim 1 further including an alarm for warning of door closure.

6. A retro-fit automatic safety garage door closer to be used with existing door operators having a motor and a transmission connecting the motor to the door to open and close the door through a path of door travel area, the automatic closer comprising:

a control unit connected to said motor to command said motor to open and close said door;

an auto closure module including a timing unit for timing a period in which said door is in an opened position, said module capable of actuating said control unit to close said door after said period has timed out; and a vehicle detector for determining whether activity is present within the general garage area, said detector being an audio detector, upon activity detection said detector being further capable of disabling said module from automatically closing the door upon timing out.

7. A retro-fit automatic safety garage door closer as defined in claim 6 wherein said timing unit is variable.

8. A retro-fit automatic safety garage door closer as defined in claim 6 wherein said timing unit is initiated upon the closing of a limit switch upon an opened door.

9. A retro-fit automatic safety garage door closer as defined in claim 6 further including a manual shut-off for deactivating said module.

10. A retro-fit automatic safety garage door closer as defined in claim 6 further including an alarm for warning of door closure.

11. A garage door operator for use with a garage having a path of door travel area and a general garage area, the operator comprising:

an electric motor;

a transmission connectable to said motor for connection to a garage door to open and close said door through the travel area;

a control unit connected to said motor to command said motor to open and close said door;

an auto closure module including a variable timing unit for timing a period in which said door is in an opened position, said module capable of actuating said control unit to close said door after said period has timed out;

a vehicle detector for determining whether any activity is present within the general garage area, said detector being a thermal detector, upon activity detection said detector being further capable of disabling said module from automatically closing the door upon timing out.

12. A garage door operator as defined in claim 11 wherein said activity detector is capable of detecting animal activity.

* * * * *